Dec. 17, 1968   P. D. COREY   3,417,315
STATIC INVERTER

Filed June 8, 1962   6 Sheets-Sheet 1

INVENTOR.
PHILIP D. COREY
BY Isidore Match
ATTORNEY

Dec. 17, 1968   P. D. COREY   3,417,315
STATIC INVERTER
Filed June 8, 1962   6 Sheets-Sheet 2

INVENTOR.
PHILIP D. COREY
BY Isidore Match

ATTORNEY

Dec. 17, 1968    P. D. COREY    3,417,315
STATIC INVERTER

Filed June 8, 1962    6 Sheets-Sheet 3

INVENTOR.
PHILIP D. COREY
BY Isidore Match
ATTORNEY

Dec. 17, 1968  P. D. COREY  3,417,315
STATIC INVERTER
Filed June 8, 1962  6 Sheets-Sheet 4

INVENTOR.
PHILIP D. COREY
BY Isidore Match
ATTORNEY

Dec. 17, 1968

P. D. COREY 3,417,315

STATIC INVERTER

Filed June 8, 1962

INVENTOR.
PHILIP D. COREY

BY Isidore Match

ATTORNEY

Dec. 17, 1968      P. D. COREY      3,417,315
STATIC INVERTER
Filed June 8, 1962                  6 Sheets-Sheet 6

FIG. 11

INVENTOR.
PHILIP D. COREY
BY Isidore Match
ATTORNEY

United States Patent Office 3,417,315
Patented Dec. 17, 1968

3,417,315
STATIC INVERTER
Philip D. Corey, Waynesboro, Va., assignor to General Electric Company, a corporation of New York
Filed June 8, 1962, Ser. No. 200,986
17 Claims. (Cl. 321—45)

This invention relates to inverter circuits. More particularly, it relates to inverter circuits for converting direct current power to alternating current power employing gate controlled rectifiers as switching elements.

Heretofore, in the operation of DC to AC inverter circuits employing gate controlled rectifiers, a major problem has been encountered when, at the end of a half cycle of operation, it is desired to render the conductive gate controlled rectifier nonconductive, and to render a complementary gate controlled rectifier conductive to initiate the next cycle of opposite polarity conduction. This changing of conductivity from one switching cycle of an inverter is commonly referred to as commutation.

Many commutation circuits have been devised. Generally, such commutation circuits include an arrangement wherein a large capacitor is charged up during a relatively long half cycle of operation and which is discharged during the relatively short interval when the commutation operation is performed, the discharging of the capacitor supplying load current during the commutation.

Many of the aforesaid inverter circuits are of the so-called "auto-impulse" type wherein the operation of rendering conductive the nonconductive gate controlled rectifier initiates commutation. This type of inverter circuit presents the advantage in that a minimum number of controlled rectifiers are required, i.e., with auto-impulse type commutation, the controlled rectifiers are utilized to handle the load current as well as to initiate commutation. Such inverter circuits are readily contrasted with inverter circuits wherein auxiliary switching devices are utilized solely to enable commutation of the separate power handling gate controlled rectifiers.

For power inverter circuits to be effective in operation, they have major requirements such as the ability to drive reactive loads and to operate under no load conditions. Many known circuits have this ability. Also, in such known circuits, the commutating capacitor may be relatively small since the capacitance value of the capacitor depends upon the maximum amount of current to be commutated and does not have the function of correcting for reactive load current.

A persistent problem which still exists with these latter known circuits results from the fact that currents of high RMS value are forced to flow through an output transformer and the DC power source during the commutation intervals. This is, of course, highly undesirable since such output transformer consequently has to be quite large to avoid its being overheated. Also, depending upon the impedance of the DC power source, appreciable ripple is induced on the DC supply voltage when these RMS currents flow through the source.

It is, accordingly, an important object of this invention to provide an inverter circuit of the "auto-impulse" type which has the ability to drive reactive loads, which can operate at no load conditions, which permits the commutating capacitor to be small and in which, the high RMS commutation currents do not flow in the output transformer or in the DC power source thereby allowing the use of an output transformer of substantially minimum size and weight and whereby substantially minimum ripple is induced on the DC supply voltage.

It is another object to provide an inverter in accordance with the preceding object which is of high efficiency and light weight.

Generally speaking and in accordance with the invention, there is provided a circuit for converting the output from a DC source to an AC power output comprising a first series arrangement of a first gate controlled rectifier and a first element connected across the source and a second series arrangement of a second and complementary gate controlled rectifier connected across the source, the first and second elements presenting a low impedance when their respectively series associated gate controlled rectifiers are conductive and presenting a high impedance when their respectively series associated gate controlled rectifiers are nonconductive. A commutating capacitor is included connected across the gate controlled rectifiers. Signal generating means is provided in circuit with the gate controlled rectifiers for alternately gating into conductivity the gate controlled rectifiers during successive half cycles of output from the signal generating means, the capacitor charging in a polarity during the conductive period of one of the gate controlled rectifiers such as to apply reverse voltage thereto and render it nonconductive when the other of the gate controlled rectifiers is rendered conductive by the signal generating means, the element in series with the other gate controlled rectifier presenting a high impedance when the other gate controlled rectifier is rendered conductive.

The novel features, which are believed to be characteristic of the invention, are set forth with particularity in the appended claims. The invention itself, however, both as to its organization and method of operation together with further objects and advantages thereof, may best be understood by reference to the following description taken in connection with the accompanying drawings.

Figure 1:
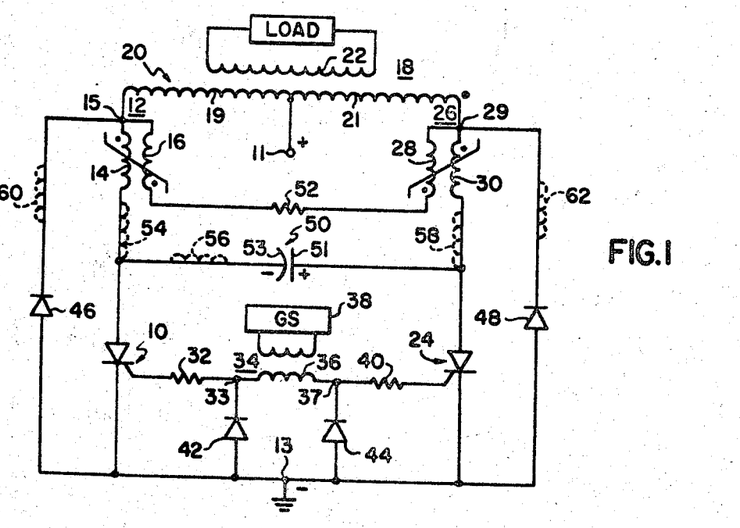
FIG. 1 is a schematic representation of a first illustrative embodiment of a center tapped inverter circuit in accordance with the principles of the invention.

Referring now to FIG. 1 wherein there is shown a "center-tapped" (or "parallel") type inverter circuit, a first silicon controlled rectifier 10 has its anode connected to the positive terminal 11 of a DC power source (not shown) through the low resistance winding 14 of a first saturable reactor 12 and half 19 of the primary winding 20 of a center-tapped output transformer 18. Similarly, a second silicon controlled rectifier 24 has its anode connected to positive terminal 11 through the low resistance winding 30 of a second saturable reactor 26 and the other half 21 of primary winding 20. The cathodes of silicon controlled rectifiers 10 and 24 are connected to the negative terminal 13 of the DC source.

Connected between the respective gate electrodes of silicon controlled rectifiers 10 and 24 is the series arrangement of a current limiting resistor 32, the secondary winding 36 of a transformer 34, across which there is developed the output of a saturable gating source 38, such as a rectangular wave multivibrator, and a current limiting resistor 40. For controlling the voltage applied to the gate electrodes of the silicon controlled rectifiers, the anode to cathode path of a first diode 42 is interposed between negative terminal 13 and the junction 33 of resistor 32 and winding 36 and the anode to cathode path of a second diode 44 is interposed between negative terminal 13 and the junction 37 of winding 36 and resistor 40.

Provided between negative terminal 13 and the junction 15 of primary winding half 19 and reactor winding 14 is the anode to cathode path of a "pump-back" diode 46 and provided between negative terminal 13 and the junction 29 of primary winding half 21 and reactor winding 30 is the anode to cathode path of a "pump-back" diode 48. A commutating capacitor 50 is connected between the anodes of silicon controlled rectifiers 10 and 24. A reset current path for saturable reactors 12 and 26 is provided by the series arrangement of a low power winding 16 for saturable reactor 12 connected to junction 15, a current limiting resistor 52 and the low power winding 28 for saturable reactor 26 connected to junction 29.

Saturable reactors 12 and 26 are suitably fairly small reactors. The characteristics of reactors 12 and 26 are so chosen such that the product of the turns of the low resistance winding such as winding 14 of reactor 12, the core area and the core saturation flux density enables the core of the reactor to go from "negative" to "positive" saturation during the brief commutation interval, and the configuration of the reactor is such that its "after-saturation" inductance is of a suitable value to form a series tuned LC circuit with commutating capacitor 50. To provide reactors which have the aforesaid characteristics, the windings of reactors 12 and 26 can be wound around two cores instead of the usual single core, one core being of a square hysteresis loop type material to produce the desired turns-area-flux density product and the second core suitably consisting of a material such as powdered permalloy to enable the providing of the desired after-saturation inductance. Instead of utilizing such double core reactors to insure proper after-saturation inductance, linear inductors such as inductors 54, 56, 58, 60 and 62 shown in dotted outline in FIG. 1 may be utilized.

In considering the operation of the circuit of FIG. 1, let it be assumed that silicon controlled rectifier 10 is gated into conductivity by a pulse from gating source 38. Due to auto-transformer action, i.e., the transformer action between the two halves of primary winding 20, essentially twice the voltage from the DC source is established across primary winding 20 with the positive terminal being at the designating polarity dot end of the winding. Also, capacitor 50, in this situation, charges to twice the voltage from the DC source with the polarity as shown in FIG. 1. This polarity condition of primary winding 20 causes saturable reactor 26 to be reset as shown by the designating polarity dot thereon by reset current flowing from junction 29 to junction 15 through reset winding 28, reset resistor 52, and reset winding 16.

When silicon controlled rectifier 24 is gated into conductivity by the next half cycle of output from gating source 38, and gating voltage is removed from silicon controlled rectifier 10, commutating capacitor 50 effectively is connected directly across silicon controlled rectifier 10 in a polarity such as to apply reverse voltage thereto and to by-pass the load current. Capacitor 50 resonates with the after-saturation inductance of winding 14 of saturable reactor 12, the natural frequency of this series LC combination controlling the duration of time for silicon controlled rectifier 10 to be reverse-biased (commutation time). The current associated with this resonant discharge flows out of side 51 of capacitor 50, through silicon controlled rectifier 24, diode 46, winding 14 of saturable reactor 12, and back to side 53 of capacitor 50. This resonant effect tends to maintain the commutation time fixed for variations of the inverter load from zero load to rated load. Hence, the LC circuit is designed to provide reverse voltage for a period sufficiently long to enable the silicon controlled rectifiers to regain their forward blocking ability. The capacitance value of capacitor 50 need only be large enough to enable the supplying of load current during the short commutation interval and does not have to be of a large enough value for lagging reactive load current.

It is to be noted that the energy stored in capacitor 50 and not needed to supply the load during the resonant discharge is returned to capacitor 50 during the resonant discharge. This current pulse does not flow through the windings of output transformer 18 or back to the DC power supply. Also, since the flux direction in the core of saturable reactor 26 is proceeding from negative to positive saturation, winding 30 of saturable reactor 26 presents a relatively high impedance during the commutation interval. This action effectively decouples the commutating current from output transformer 18 and the DC power supply during the commutation interval. Immediately following the commutation interval, reactor 26 saturates and silicon controlled rectifier 24 conducts load current during the next half cycle. Capacitor 50 is consequently charged with side 53 positive and side 51 negative and reactor 12 is reset to prepare for the next commutation pulse.

Figure 2:
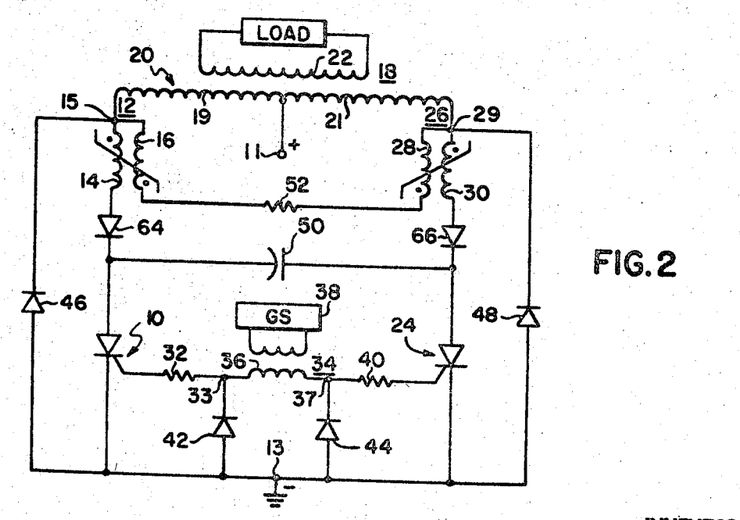
FIG. 2 is a schematic depiction of a circuit similar to FIG. 1.

It has been found in the circuit of FIG. 1 that there exists therein a "ferroresonant" oscillation in the LC circuits formed by commutation capacitor 50 and the saturable reactors 12 and 26. A "ferro-resonant" oscillation occurs in an LC circuit wherein a non-linear inductor, i.e., one having a saturable core is utilized. In this type of circuit, when the core of the inductor saturates, it abruptly goes from a "high impedance" to a "low impedance" state and rapidly transfers its energy to the capacitor. Accordingly, in such oscillation, capacitor 50 actually "over-charges" to more than twice the value of the DC power source. To suppress this oscillation, several circuit modifications can be made in the circuit of FIG. 1. Thus, for example, the value of reset resistor 52 can be reduced to the point that the oscillation of the aforesaid LC circuits is effectively "damped." The "ferroresonant" oscillation can also be damped with the arrangement of FIG. 2. It is seen in the latter circuit that it is essentially the same as the circuit in FIG. 1 except that the anode to cathode paths of diodes 64 and 66 are interposed between the windings 14 and 30 and the anodes of silicon controlled rectifiers 10 and 24 respectively. In the circuit of FIG. 2 in the event that resistor 52 does not provide sufficient damping for the suppression of this "ferro-resonant" oscillation, then diodes 64 and 66 function effectively as clamps to provide the required damping effect.

Figure 3:
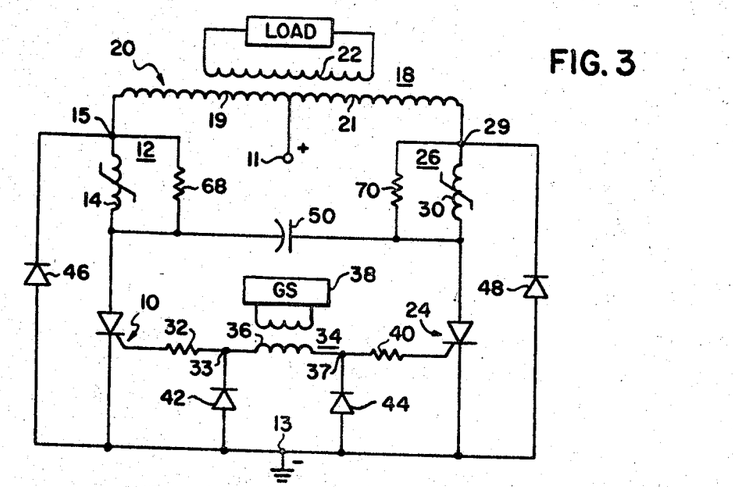
FIG. 3 is a schematic diagram of a circuit similar to the circuits of FIGS. 1 and 2.

It has been found that advantage can be taken of this "ferroresonant" oscillation tendency. In FIG. 3, there is shown a circuit in which this advantage is availed of. It is noted that the circuit of FIG. 3 is essentially similar to the circuit of FIG. 1. However, in the circuit of FIG. 3, saturable reactors 12 and 26 are shown having only one winding and not having a "reset" winding. During the period of the commutation pulse in the operation of the circuit of FIG. 3, capacitor 50 actually "over-charges" to more than twice the voltage from the DC source due to this "ferroresonant" oscillation action. In the circuit of FIG. 3, as capacitor 50 discharges back to a value of twice the DC source voltage, a saturable reactor is reset without the necessity of added reset windings. The values of resistors 68 and 70 are so chosen that further ferroresonant oscillation is effectively damped out.

Figure 4:
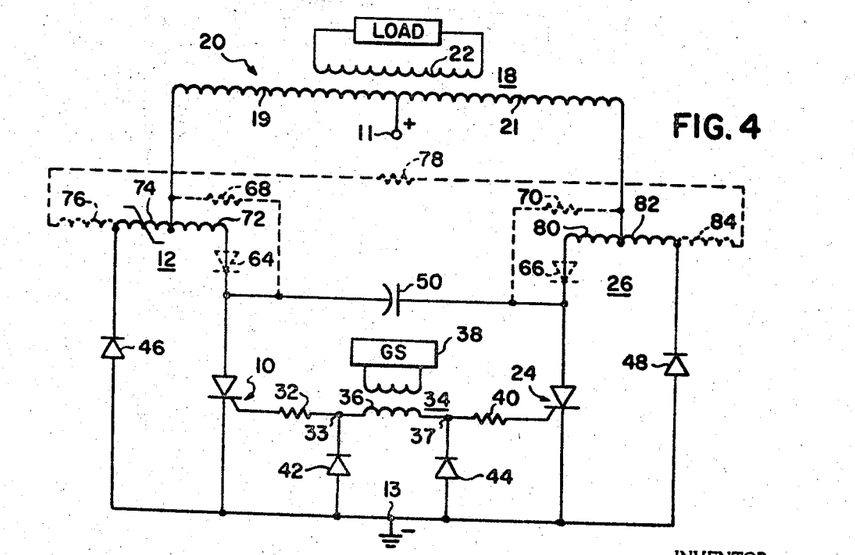
FIG. 4 is a schematic representation of a circuit similar to that of FIGS. 1 to 3.

In FIG. 4, there is shown a circuit in accordance with the invention wherein the design of saturable reactors 12 and 26 is considerably simplified. The desired requirements of saturable reactors that have to be met simultaneously are adequate volt-second hold-off capability and sufficient after-saturation inductance to enable their resonating with commutating capacitor 50. In the circuit of FIG. 4, winding 72, for example, of saturable reactor 12 is designed to provide the desired volt-second hold-off capability. Since, in many practical design situations, it may happen that the after-saturation inductance of winding 72 is somewhat different from the desired optimum value, winding 74 is added to the saturable reactor. In this connection, it is to be noted that winding 74, connected in series arrangement with winding 72, is part of the series resonant circuit with the commutating capacitor 50 during the commutating interval. Accordingly, winding 74 can be chosen independently so that the after-saturation inductance of saturable reactor 12, for example, i.e., the after-saturation inductance of the combination of windings such as windings 72 and 74 is of the desired value. In this connection, winding 74 may be chosen to either increase or decrease the after-saturation inductance of the saturable reactor depending upon the polarity of winding connections.

To reset the saturable reactors such as, for example, saturable reactor 12, many arrangements may be utilized. Thus, for example, an additional winding 76 and resistor 78 shown in dotted outline may be connected as depicted with or without diodes 64 and 66, also shown in dotted outline for suppressing "ferroresonant" oscillation. Alternatively, winding 76 may be omitted and resistors 68 and 70 may be inserted as shown to take advantage of the ferroresonant condition to provide the resetting action in the same manner as previously described in connection with circuit of FIG. 3.

Figure 5:
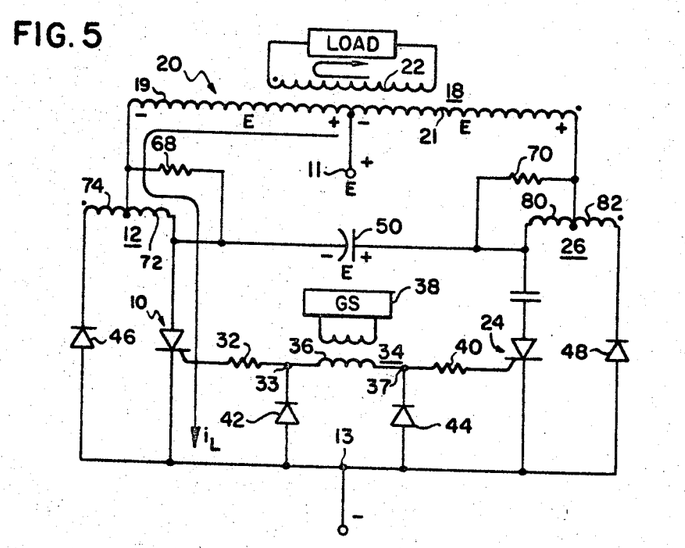
FIGS. 5 to 10 are schematic diagrams substantially the same as the diagram of FIG. 4 and are conveniently utilized in the explanation of the operation of the circuit of FIG. 4.

FIGS. 5–10 which are essentially drawings of the circuit of FIG. 5 which includes resistors 68 and 70 are included to clarify the operation of the commutation circuit shown therein utilizing commutation reactors in accordance with the invention. Thus, FIG. 5 shows the condition which obtains at the end of a half cycle of operation. It is seen that load current $i_1$ is flowing as shown therein through silicon controlled rectifier 10 and commutating capacitor 50 is charged as depicted. It is assumed that the circuit inductances are of a value sufficient such that load current continues in the same direction during the very brief commutating intervals until the next half cycle of operation is initiated by gating silicon controlled rectifier 24 into conductivity and removing the gating voltage from silicon controlled rectifier 10.

Figure 6:
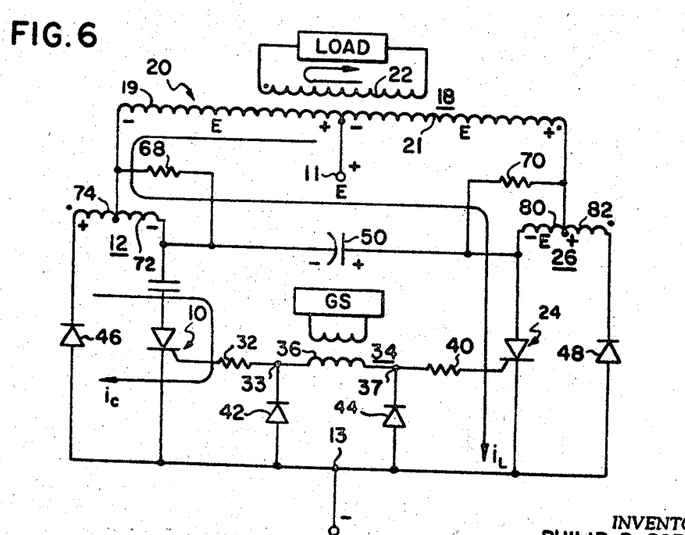
Figure 7:
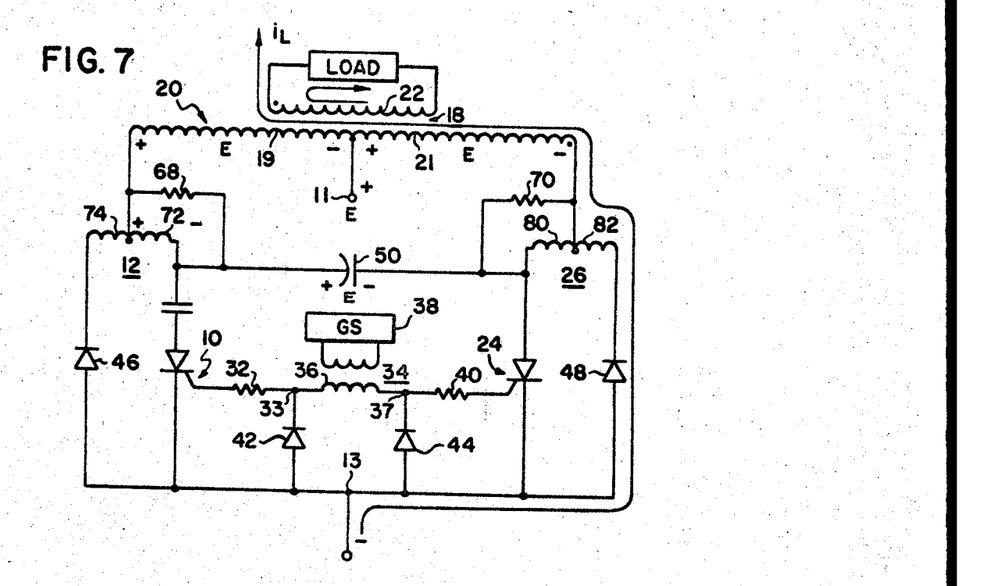

FIG. 6 shows the situation that obtains immediately following the gating of silicon controlled rectifier 24 into conductivity. Silicon controlled rectifier 10 is switched to its blocking state by the polarity of the charge on capacitor 50 and a resonant discharge is occurring, in which the excess energy on capacitor 50, not needed to supply the load, is first stored in the after-saturation inductance of saturation reactor 12. Commutating current plus load current flows through silicon controlled rectifier 24. Saturable reactor 26, which was previously completely reset, is now proceeding toward saturation due to the influence of the voltage applied to winding 80, saturable reactor 26, of course, presenting a relatively high impedance during this commutating interval. Commutating current, $i_c$, persists until the energy in capacitor 50 has been transferred into saturable reactor 12 and from saturable reactor 12 back into capacitor 50, thereby charging capacitor 50 to the opposite polarity.

Substantially simultaneously with the cessation of the flow of commutating current $i_c$, saturable reactor 26 saturates and presents essentially zero impedance. The situation depicted in FIG. 7 now exists. Load current $i_1$ flows through pump-back diode 48, winding 82 of the now saturated saturable reactor 26 and output transformer 18, thereby returning energy from the load to the DC power source.

Figure 8:
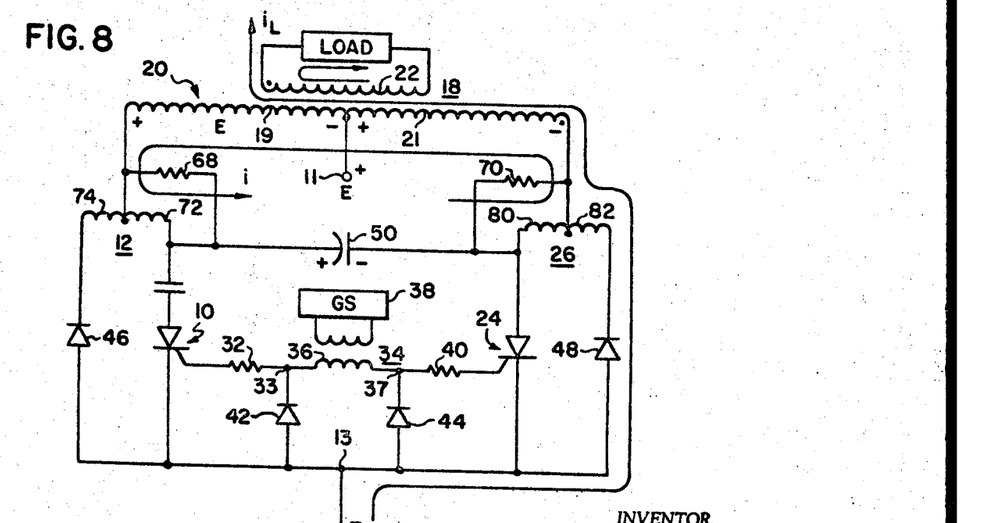

It is to be noted as shown in FIG. 8 that the terminal voltage of the primary winding 20 of transformer 18 have suddenly reversed, thereby applying a voltage across winding 72 of saturable reactor 12, this voltage being the difference between the voltage across capacitor 50 and the terminals of primary winding 20. This condition causes a relatively small transient current component in FIG. 8. This transient current component is shown as $i$, the transient component resulting in a resonantly over-charging of capacitor 50 to a voltage higher than the transformer terminal voltage.

Figure 9:
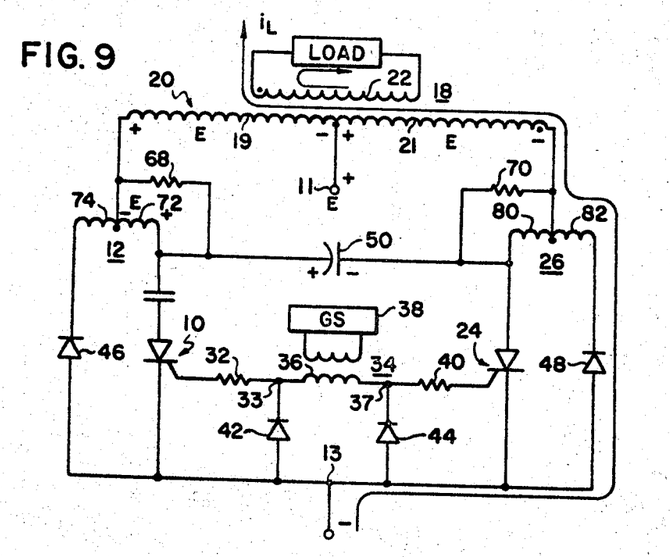

In FIG. 9 there is shown the condition at the end of this over-charging. It is to be noted that the difference between the voltages across capacitor 50 and the transformer terminal voltage is applied across winding 72 of saturable reactor 12 to effect the resetting of saturable reactor 12. Resistors 68 and 70 are chosen to have a value respectively such as to damp out any further oscillations between the saturable reactors and capacitor 50, thus leaving saturable reactor 12 in the reset condition and in a ready state for the alternate commutation impulse.

Figure 10:
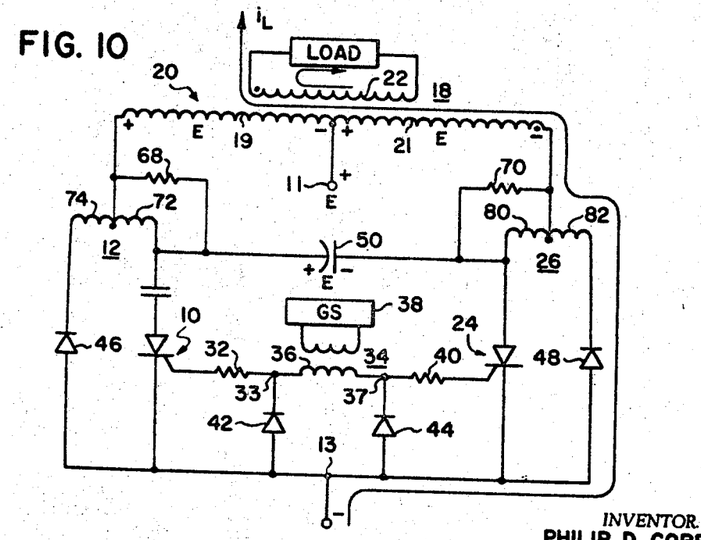

In FIG. 10 there is shown the circuit condition after the commutation has been completed. Thus, it is seen that while the half cycle proceeds, current $i_1$ reverses as energy is returned from the DC source to the load and the condition of the circuit is comparable to the condition depicted in FIG. 6 with silicon controlled rectifier 24 conducting instead of silicon controlled rectifier 10 and with polarities reversed.

Figure 11:
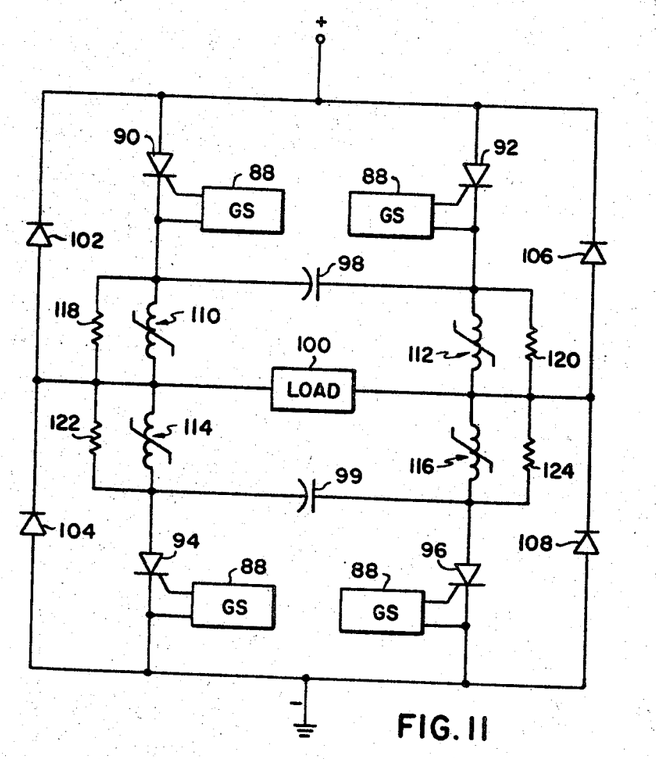
FIG. 11 is a schematic depiction of a bridge type inverter circuit in accordance with the principles of the invention.

In FIG. 11 there is shown an arrangement, for example, where saturable reactor commutation is utilized in a bridge type inverter circuit. The gating source 88, although shown in four locations, may be a single common source. In this circuit, silicon controlled rectifiers 90 and 96 are simultaneously gated into conductivity by a half cycle from the output of gating source 88 and during the other half cycle of output from gating source 88, silicon controlled rectifiers 92 and 94 are triggered into conductivity. Capacitor 98 functions to provide commutation between silicon controlled rectifiers 90 and 92 and capacitor 99 functions to provide commutation between silicon controlled rectifiers 94 and 96. In this manner, the alternating current voltage is applied to load 100. Diodes 102, 104, 106 and 108 function to provide pump-back paths for handling reactive loads and also function in the commutation circuits in the same manner as they do in the center-tapped circuits depicted in FIGS. 1–4. Saturable reactors 110, 112, 114 and 116 perform the decoupling and resonant commutating with capacitors 98 and 99 respectively and resistors 118, 120, 122 and 124 serve to damp "ferroresonant" type oscillations while permitting the proper reset voltages to be applied to the saturable reactors. Similar to many variations that may be utilized in the center-tapped inverter circuits, linear reactors and/or additional windings on the saturable reactors may be utilized in the bridge inverter circuit of FIG. 11.

In connection with the design of saturable reactors to function as the volt-second gate commutating reactors in FIGS. 1–4 and FIG. 11, it is assumed that the static inverter VA output is held constant and that the DC supply voltage is the independent variable.

With regard to inductance, as voltage is increased, current reduces linearly, thereby keeping the static inverter output VA constant. If the commutation time remains constant, the volt-second gate, i.e., the saturable reactor turns increase in linear proportion to the increase in supply voltage. Since the after-saturation inductance increases with the square of the turns, the after-saturation inductance of a saturable reactor, when utilized as a volt-second gate, varies as the square of the supply voltage.

The currents which have to be supplied by the commutating circuit vary inversely as the applied voltage. In the series LC resonant circuit which includes the after-saturation inductance of the primary winding of the saturable reactor, the peak current is given by the expression $I_p = E_s C_w$. Thus, as the supply voltage is doubled, peak current is halved and the required commutating capacitor capacitance is one-fourth of the original capacitor value to maintain constant commutation time. Keeping the LC product constant, there is needed four times the original inductance L. This is exactly what is available since the voltage is doubled, the amount of turns on the primary windings of the saturable reactor is also doubled, and, thus, there is obtained four times the value of the original inductance L.

With regard to the power losses in the saturable reactor, there are to be considered the copper losses, the power losses, and the core losses. In connection with the copper losses in the primary winding of the saturable reactor, the primary winding RMS currents which have to be handled will vary as follows:

The currents, both "commutating" and "steady-state," vary inversely with the operating voltage of the inverter. The power loss varies as the square of the currents, and for a given resistance, tends to vary inversely as the square of the supply voltage. In contrast, as the supply voltage is increased, more turns are required in direct proportion and the resistance of the windings vary as the square of the number of turns if the winding volume is maintained at a constant value. Thus, for a given volume, the saturable reactor winding resistances vary as the square of the supply voltage. It is, accordingly, seen that no change in the saturable reactor primary winding copper losses occurs when the operating voltage of the inverter is varied.

In connection with the power losses, where a separate winding is utilized to reset the saturable reactor, the commutating circuit may appear as a load to the resetting circuit. In a given time interval, depending upon inverter operating frequency, the voltage on the commutating capacitor has to be charged through transformer action up to a voltage proportional to the inverter supply voltage. Since $$\Delta e_o = \frac{i}{C} \int_0^v i_v dt$$

expresses voltage change on the commutating capacitor due to reset current, it is noted that the reset winding current is proportional to the commutating capacitor C and the change in capacitor voltage, $\Delta e_c$. Since C varies inversely as the square of the applied voltage, and $\Delta e_c$ varies directly with supply voltage, reset winding current varies inversely with supply voltage. It is, therefore, seen that because of the manner in which winding resistances vary for constant winding volume, changes in supply voltage do not result in any change in reset winding copper loss.

With regard to core losses, core loss is not a function of the inverter supply voltage but is a function of the rate of change of flux and the required commutations per second which in turn depend upon the inverter frequency. If the commutation interval is maintained constant, rate of change of flux density is constant. Thus, for a given inverter frequency, the core loss in the saturable reactor is independent of operating voltage. From the foregoing it is seen that if the static inverter VA output is kept constant, changing the DC supply voltage does not result in changing the physical size of the saturable reactor. Also, if the saturable reactor is designed to have the proper after-saturation inductance at one voltage level, as the supply voltage value is changed, the saturable reactor will naturally have the desired after-saturation inductance which is required. This is, of course, true for the case where a powdered iron core is included in the windings of the saturable reactors to permit adjustment of after-saturation inductance.

While there have been shown particular embodiments of this invention, it will, of course, be understood that it is not intended to be limited thereto since many modifications both in the circuit arrangements and in the instrumentalities employed therein may be made and it is therefore contemplated by the appended claims to cover any such modifications as fall within the true spirit and scope of the invention.

What is claimed as new and desired to be secured by Letters Patent of the United States is:

1. A circuit for converting the output from a DC source to an AC power output comprising a first series arrangement of a first gate controlled rectifier and a first saturable device connected across said source, a second series arrangement of a second and complementary gate controlled rectifier and a second saturable device connected across said source, said first and second saturable devices respectively presenting a low impedance when said first and second gate controlled rectifiers are correspondingly respectively conductive, a commutating capacitance connected between said gate controlled rectifiers, and signal generating means in circuit with said gate controlled rectifiers for alternately gating into conductivity said gate controlled rectifiers during successive half cycles of output from said signal generating means, said capacitance charging in a polarity during the conductive period of one of said gate controlled rectifiers such as to apply reverse voltage thereto to render it nonconductive when the other of said gate controlled rectifiers is gated into conductivity, the saturable device in series arrangement with said other gate controlled rectifier presenting a high impedance when said other gate controlled rectifier is initially gated into conductivity.

2. A circuit for converting the output from a DC source to an AC power output comprising a first series arrangement of a first gate controlled rectifier and a first saturable reactor, a second series arrangement comprising a second gate controlled rectifier and a second saturable reactor, a transformer connected between said arrangements, said combination of said series arrangements and said transformer being connected across said source, said first and second saturable reactors respectively presenting a low impedance when said first and second gate controlled rectifiers are respectively correspondingly conductive, a commutating capacitance connected between said gate controlled rectifiers, and signal generating means in circuit with said gate controlled rectifiers for alternately gating into conductivity said gate controlled rectifiers during successive half cycles of output from said signal generating means, said capacitance charging in a polarity during the conductive period of one of said gate controlled rectifiers such as to apply reverse voltage thereto to render it nonconductive when the other of said gate controlled rectifiers is initially gated into conductivity, the saturable reactor in series arrangement with said other gate controlled rectifier presenting a high impedance when said other gate controlled rectifier is initially gated into conductivity to prevent said capacitor from discharging into said source and said transformer.

3. A circuit for converting the output from a DC source to an AC power output comprising first and second saturable reactors, each of said saturable reactors comprising a low resistance winding and a low power winding, first and second gate controlled rectifiers in first and second series arrangements with said first and second low resistance windings respectively, a transformer connected between said arrangements, said combination of said series arrangements and said transformer being connected across said source, said first and second saturable reactors presenting a low impedance when said first and second gate controlled rectifiers are respectively correspondingly conductive, a commutating capacitance connected between said gate controlled rectifiers, and signal generating means in circuit with said gate controlled rectifiers for alternately gating into conductivity said gate controlled rectifiers during successive half cycles of output from said signal generating means, said capacitance charging in a polarity during the conductive period of one of said gate controlled rectifiers such as to apply reverse voltage thereto to render it nonconductive when the other of said gate controlled rectifiers is initially gated into conductivity, said saturable reactors being so chosen that the after-saturation inductance of said low resistance winding and said capacitance form a resonating circuit to provide a commutation interval having a duration to insure the rendering nonconductive of said one gate controlled rectifier, the product of the turns of the low resistance winding, the core area, and core saturation flux density of the respective saturable reactors being chosen to insure that a reactor goes from one direction to the opposite direction of saturation during said interval, said low resistance winding in series arrangement with said other gate controlled rectifier presenting a high impedance during said interval to prevent said capacitance from discharging into said source and said transformer, the saturable reactor in series arrangement with the nonconductive gate controlled rectifier having its saturation direction switched during the period of conduction of the conductive gate controlled rectifier.

4. A circuit as defined in claim 3 wherein there are further included first and second diodes connected across said first and second series arrangements respectively.

5. A circuit as defined in claim 4 wherein there is further included a current limiting resistance connected between said low power windings.

6. A circuit for converting the output of a DC source to an AC power output comprising first and second saturable reactors, each of said saturable reactor comprising a low resistance winding and a low power winding, first and second inductances, first and second gate controlled rectifiers in first and second series arrangements with said first and second low resistance windings and said first and second inductances respectively, a transformer connected between said arrangements, said combination of said series arrangements and said transformer being connected across said source, said first and second saturable reactors presenting a low impedance when said first and second gate controlled rectifiers are respectively correspondingly conductive, a third series arrangement of a capacitance and a third inductance connected between said gate controlled rectifiers and signal generating means in circuit with said gate controlled rectifiers for alternately gating into conductivity said controlled rectifiers during successive half cycles of output from said signal generating means, said capacitance charging in a polarity during the conductive period of one of said gate controlled rectifiers such as to apply reverse voltage thereto to render it nonconductive when the other of said gate controlled rectifiers is initially gated into conductivity, said inductances being so chosen as to form a resonating circuit with said capacitor to provide a commutating interval having a duration sufficiently long to insure the rendering nonconductive of said one gate controlled rectifier the product of the turns of the low resistance winding, the core area and core saturation flux density of the respective saturable reactors being chosen to insure that a saturable reactor goes from one direction to the opposite direction of saturation during said interval, said low resistance winding in series arrangement with said other gate controlled rectifier presenting a high impedance during said interval to prevent said capacitance from discharging into said source and said transformer, the saturable reactor in series arrangement with the nonconducting gate controlled rectifier having its saturation direction switched during the period of conduction of the conducting gate controlled rectifier.

7. A circuit as defined in claim 6 wherein the series combination of a first diode and a fourth inductance is connected across said first series arrangement and a second diode and a fifth inductance is connected across said second series arrangement.

8. A circuit as defined in claim 7 wherein there is further included a current limiting resistance connected between said low power windings.

9. A circuit for converting the output of a DC source to an AC power output comprising first and second saturable reactors, each of said saturable reactor comprising a low resistance winding and a low power winding, first and second diodes, first and second gate controlled rectifiers in first and second series arrangements with said first and second low resistance windings and said first and second diodes respectively, a transformer connected between said arrangements, said combination of said series arrangements and said transformer being connected across said source, said first and second saturable reactors presenting a low impedance when said first and second gate controlled rectifiers are respectively correspondingly conductive, a commutating capacitance connected between said gate controlled rectifiers, and signal generating means in circuit with said gate controlled rectifiers for alternately gating into conductivity said gate controlled rectifiers during successive half cycles of output from said signal generating means, said capacitance charging in a polarity during the conductive period of one of said gate controlled rectifiers such as to apply reverse voltage thereto to render it nonconductive when the other of said gate controlled rectifiers is initially gated into conductivity, said saturable reactors being so chosen that the after-saturation inductance of said low resistance winding and said capacitance form a resonating circuit to provide a commutation interval having a duration sufficiently long to insure the rendering nonconductive of said one gate controlled rectifier, the product of the turns of the low resistance winding, the core area, and core saturation flux density of the respective saturable reactors being chosen to insure that a reactor goes from one direction to the opposite direction of saturation during said interval, said low resistance winding in series arrangement with said other gate controlled rectifier presenting a high impedance during said interval to prevent said capacitance from discharging into said source and said transformer, the saturable reactor in series arrangement with the nonconducting gate controlled rectifier having its saturation direction switched during the period of conduction of the conducting gate controlled rectifier.

10. A circuit as defined in claim 9 wherein there are further included a third diode connected across said first series arrangement and a fourth diode connected across said second series arrangement.

11. A circuit as defined in claim 10 wherein there is further included a current limiting resistance connected between said low power windings.

12. A circuit for converting the output of a DC source to an AC power output comprising first and second saturable reactors, first and second gate controlled rectifiers in first and second series arrangements with said first and second saturable reactors respectively, a transformer connected between said arrangements, said combination of said series arrangements and said transformer being connected across said source, said first and second saturable reactors presenting a low impedance when said first and second gate controlled rectifiers are respectively correspondingly conductive, a commutating capacitance connected between said gate controlled rectifiers, first and second resistances connected across said first and second reactors respectively, and signal generating means in circuit with said gate controlled rectifiers for alternately gating into conductivity said gate controlled rectifiers during successive half cycles of output from said signal generating means, said capacitance charging in a polarity during the conductive period of one of said gate controlled rectifiers such as to apply reverse voltage thereto to render it nonconductive when the other of said gate controlled rectifiers is initially gated into conductivity, said saturable reactors being so chosen that the after-saturation inductance of its winding and said capacitance form a resonating circuit to provide a commutation interval having a duration to insure the rendering nonconductive of said one gate controlled rectifier, the product of the turns of the winding, the core area and core saturation flux density of the respective saturable reactors being chosen to insure that a saturable reactor goes from one direction to the opposite direction of saturation during said interval, the saturable reactor in series arrangement with the other gate controlled rectifier presenting a high impedance during said interval to prevent said capacitor from discharging into said source and said transformer, the saturable reactor in series arrangement with the nonconducting gate controlled rectifier having its saturation direction switched during the period of conduction of the conducting gate controlled rectifier.

13. A circuit as defined in claim 12 wherein there are further included first and second diodes connected across said first and second series arrangements respectively.

14. A circuit for converting the output from a DC source to an AC power output comprising first and second saturable reactors, each of said reactors comprising a low resistance winding and a low power winding, first and second gate controlled rectifiers in first and second series arrangements with said first and second low resistance windings respectively, a transformer connected between said arrangements, said combination of said series arrangements and said transformer being connected across said source, said first and second saturable reactors presenting a low impedance when said first and second gate controlled rectifiers are respectively correspondingly conductive, a commutating capacitance connected between said gate controlled rectifiers, a third series arrangement comprising said low power winding and a first diode connected across said first series arrangement and a fourth series arrangement comprising said second low power winding and a second diode connected across said second series arrangement, and signal generating means in circuit with said gate controlled rectifiers for alternately gating into conductivity said controlled rectifiers during successive half cycles of output from said signal generating means, said capacitance charging in a polarity during the conductive period of one of said gate controlled rectifiers such as to apply reverse voltage thereto to render it non-conductive when the other of said gate controlled rectifiers is initially gated into conductivity, said saturable reactors being so chosen that the after saturation of the low resistance and low power winding together with said capacitance form a resonating circuit to provide a commutation interval having a duration to insure the rendering nonconductive of said one gate controlled rectifier, the product of the turns of the low resistance winding, the core area, and core saturation flux density of the respective saturable reactors being chosen to insure that a saturable reactor goes from one direction to the opposite direction of saturation during said interval, said low resistance winding in series arrangement with said other gate controlled rectifier presenting a high impedance during said interval to prevent said capacitor from discharging into said source and said transformer, the saturable reactor in series arrangement with the nonconducting gate controlled rectifier having its saturation direction switched during the period of conduction of the conducting gate controlled rectifier.

15. The circuit defined in claim 14 wherein said first and second saturable reactors further comprise a third winding, each of said third windings being connected to the respective other windings of said saturable reactors and wherein there is further included a resistance connected between said third windings.

16. The circuit defined in claim 15 wherein first and second diodes are further included in said first and second series arrangements.

17. The circuit defined in claim 14 wherein there are further included respective resistances connected across said low resistance windings.

References Cited
UNITED STATES PATENTS

| | | | |
|---|---|---|---|
| 2,809,303 | 10/1957 | Collins | 307—88 |
| 3,080,534 | 3/1963 | Paynter | 331—113.1 |
| 3,085,190 | 4/1963 | Kearns et al. | 321—45 |

LEE T. HIX, *Primary Examiner.*

W. SHOOP, *Assistant Examiner.*